United States Patent
Vassilieva et al.

(10) Patent No.: US 10,389,473 B1
(45) Date of Patent: Aug. 20, 2019

(54) REACH EXTENSION FOR OPTICAL NETWORKS THROUGH CONTROL OF MODULATION FORMATS AND NUMBERS OF SUBCARRIERS

(71) Applicant: Fujitsu Limited, Kawasaki-shi, Kanagawa (JP)

(72) Inventors: Olga I. Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/964,297

(22) Filed: Apr. 27, 2018

(51) Int. Cl.
| | | |
|---|---|---|
| *H04B 10/25* | (2013.01) | |
| *H04J 14/02* | (2006.01) | |
| *H04Q 11/00* | (2006.01) | |
| *H04B 10/516* | (2013.01) | |

(52) U.S. Cl.
CPC .......... *H04J 14/0298* (2013.01); *H04B 10/25* (2013.01); *H04B 10/516* (2013.01); *H04J 14/0267* (2013.01); *H04Q 11/0062* (2013.01)

(58) Field of Classification Search
CPC .............. H04B 10/616; H04B 10/6162; H04B 10/6161; H04B 10/2543
USPC ............................................. 398/76, 91, 45
See application file for complete search history.

(56) References Cited

U.S. PATENT DOCUMENTS

| | | | | |
|---|---|---|---|---|
| 6,272,186 B1 * | 8/2001 | Bontu | ...................... | H04L 27/18 375/340 |
| 7,636,525 B1 * | 12/2009 | Bontu | ..................... | H04B 10/60 398/208 |
| 9,112,607 B1 * | 8/2015 | Dave | ................... | H04B 10/2513 |
| 9,531,480 B2 * | 12/2016 | Xie | ....................... | H04B 10/616 |
| 2012/0224851 A1 * | 9/2012 | Takara | ............... | H04B 10/0793 398/45 |
| 2012/0251120 A1 * | 10/2012 | McNicol | .............. | H04B 10/506 398/91 |

(Continued)

OTHER PUBLICATIONS

Meng Qiu et al., "Subcarrier Multiplexing Using DACs for Fiber Nonlinearity Mitigation in Coherent Optical Communication Systems", Proc. OFC, paper Tu3J.2C (2014); 3 pages.

(Continued)

*Primary Examiner* — Oommen Jacob
(74) *Attorney, Agent, or Firm* — Baker Botts L.L.P.

(57) ABSTRACT

A disclosed method for extending reach in an adaptive optical network may include selecting, for an optical channel having a given target distance and a given maximum data rate, the modulation format having the highest spectral efficiency among modulation formats supported in the adaptive optical network that are suitable for optical channels having the given target distance and the given maximum data rate, determining a symbol rate for the optical channel dependent on characteristics of transmission media for the optical channel, determining a number of subcarriers for the optical channel corresponding to the determined symbol rate, and activating subcarrier multiplexing (SCM) for the optical channel. Activating SCM may include configuring transponders to transmit or receive the traffic in the optical channel using the selected modulation format and the determined number of subcarriers. The method may be implemented by a network management system of the optical network.

17 Claims, 10 Drawing Sheets

(56) References Cited

U.S. PATENT DOCUMENTS

2013/0230311 A1* 9/2013 Bai ................... H04B 10/2581
                                                    398/9
2015/0071630 A1* 3/2015 Oyama ............. H04B 10/6163
                                                    398/25

OTHER PUBLICATIONS

P. Poggiolini et al., "Analytical results on system maximum reach increase through symbol rate optimization", OFC, paper Th3D.6 (2015); 3 pages.

P. Poggiolini et al., "On the ultimate potential of symbol-rate optimization for increasing system maximum reach", Proc. ECOC, paper We.4.6.2, 2015; 3 pages.

H. Nakashima et al., "Experimental investigation on nonlinear tolerance of subcarrier multiplexed signals with spectrum optimization", Proc. ECOC, paper Mo.3.6.4, 2015; 3 pages.

O. Vassilieva et al., "Reach extension with 32- and 64 Gbaud single carrier vs. multi-carrier signals", Proc. OFC, paper Th2A.60, 2017; 3 pages.

* cited by examiner

REACH EXTENSION FOR OPTICAL NETWORKS THROUGH CONTROL OF MODULATION FORMATS AND NUMBERS OF SUBCARRIERS

BACKGROUND

Field of the Disclosure

The present disclosure relates generally to optical communication systems and, more particularly, to reach extension for optical networks through control of modulation formats and numbers of subcarriers.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network. The transmission reach of an optical channel may be limited by the use of higher order modulations formats.

Optical superchannels are an emerging solution for transmission of signals at 400 Gbit/s and 1 Tbit/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency. The transmission reach of a superchannel may be limited by various factors.

Another technique for transmission of optical signals is the use of a multi-carrier channel (also referred to as subcarrier multiplexing (SCM) or Nyquist frequency division multiplexing (Nyquist-FDM)). A multi-carrier channel is generated at a transmitter for an optical channel but with division of the optical channel into a given number of subcarriers. As with superchannels, the transmission reach of a multi-carrier channel may be limited by various factors, such as certain nonlinear effects that undesirably increase noise.

SUMMARY

In one aspect, a system for extending reach in an adaptive optical network is disclosed. The system may include a plurality of optical transponders and a network management system including memory media and a processor having access to the memory media. The memory media may store instructions executable by the processor for selecting a modulation format for an optical channel having a given target distance and a given maximum data rate, the selected modulation format having the highest spectral efficiency among one or more of a plurality of modulation formats supported in the adaptive optical network that are suitable for optical channels having the given target distance and the given maximum data rate; determining a symbol rate for the optical channel dependent on one or more characteristics of transmission media over which traffic is carried in the optical channel; determining a number of subcarriers for the optical channel corresponding to the determined symbol rate; and activating subcarrier multiplexing for the optical channel, the activating including sending instructions to one or more of the plurality of optical transponders to transmit or receive the traffic in the optical channel using the selected modulation format and the determined number of subcarriers.

In any of the disclosed embodiments, determining the symbol rate for the optical channel may include calculating the symbol rate dependent on a dispersion coefficient of an optical fiber over which the traffic is carried in the optical channel.

In any of the disclosed embodiments, determining the symbol rate for the optical channel may include calculating the symbol rate dependent on one or more of a number of spans over which the traffic is carried in the optical channel and a respective length of each of one or more spans over which the traffic is carried in the optical channel.

In any of the disclosed embodiments, determining the symbol rate for the optical channel may include obtaining the symbol rate from a data structure in which the symbol rate is mapped to the one or more characteristics of the transmission media over which the traffic is carried in the optical channel. The one or more characteristics of the transmission media include one or more of a dispersion coefficient of an optical fiber over which the traffic is carried in the optical channel, a number of spans over which the traffic is carried in the optical channel, and a respective length of each of one or more spans over which the traffic is carried in the optical channel.

In any of the disclosed embodiments, the transmission media over which traffic is carried in the optical channel may include multiple spans, the multiple spans including optical fibers of two or more optical fiber types. Determining the symbol rate may include determining respective portions of the transmission media including optical fibers of each of the two or more optical fiber types and calculating the symbol rate dependent on the respective portions of the transmission media including the optical fibers of each of the two or more optical fiber types.

In any of the disclosed embodiments, the transmission media over which traffic is carried in the optical channel may include multiple spans, the multiple spans including optical fibers of two or more optical fiber types. Determining the symbol rate may include determining a ratio of a total length of spans including optical fibers of a first optical fiber type and a total length of spans including optical fibers of a second optical fiber type and obtaining the symbol rate from a data structure in which symbol rates are mapped to respective ratios of the total length of spans including optical fibers of the first optical fiber type and the total length of spans including optical fibers of the second optical fiber type.

In any of the disclosed embodiments, the memory media may also store instructions executable by the processor for obtaining, from a data structure, routing information for the optical channel and determining, dependent on the routing information, one or more of the given target distance, the given maximum data rate and the one or more characteristics of transmission media over which traffic is carried in the optical channel.

In any of the disclosed embodiments, determining a symbol rate for the optical channel may be further dependent on a desired or expected optical noise-to-signal ratio margin for the optical channel.

In any of the disclosed embodiments, the memory media may also store instructions executable by the processor for detecting a topology change in the adaptive optical network.

The memory media may also store instructions executable by the processor for, in response to the detected topology change, selecting a different modulation format for the optical channel, determining a different symbol rate for the optical channel, determining a different number of subcarriers for the optical channel corresponding to the different symbol rate, and re-configuring at least one of the one or more optical transponders to transmit or receive the traffic in the optical channel using the different modulation format and the different number of subcarriers.

In any of the disclosed embodiments, each of the plurality of optical transponders may include a transmitter digital signal processor, a receiver digital signal processor, first circuitry to implement each of the plurality of modulation formats, second circuitry to configure the transmitter digital signal processor to generate optical signals for transmission in the optical channel using the selected modulation format, third circuitry to configure the transmitter digital signal processor to generate optical signals for transmission in the optical channel using the determined number of subcarriers, and fourth circuitry to configure the receiver digital signal processor to process optical signals received over the optical channel in accordance with the selected modulation format and the determined number of subcarriers.

In another aspect, a method for extending reach in an adaptive optical network is disclosed. The method may include selecting a modulation format for an optical channel having a given target distance and a given maximum data rate, the selected modulation format having the highest spectral efficiency among one or more of a plurality of modulation formats supported in the adaptive optical network that are suitable for optical channels having the given target distance and the given maximum data rate; determining a symbol rate for the optical channel dependent on one or more characteristics of transmission media over which traffic is carried in the optical channel; determining a number of subcarriers for the optical channel corresponding to the determined symbol rate; and activating subcarrier multiplexing for the optical channel, the activating including configuring one or more optical transponders to transmit or receive the traffic in the optical channel using the selected modulation format and the determined number of subcarriers.

In any of the disclosed embodiments, determining the symbol rate for the optical channel may include calculating the symbol rate dependent on a dispersion coefficient of an optical fiber over which the traffic is carried in the optical channel.

In any of the disclosed embodiments, determining the symbol rate for the optical channel may include calculating the symbol rate dependent on one or more of a number of spans over which the traffic is carried in the optical channel and a respective length of each of one or more spans over which the traffic is carried in the optical channel.

In any of the disclosed embodiments, determining the symbol rate for the optical channel may include obtaining the symbol rate from a data structure in which the symbol rate is mapped to the one or more characteristics of the transmission media over which the traffic is carried in the optical channel. The one or more characteristics of the transmission media include one or more of a dispersion coefficient of an optical fiber over which the traffic is carried in the optical channel, a number of spans over which the traffic is carried in the optical channel, and a respective length of each of one or more spans over which the traffic is carried in the optical channel.

In any of the disclosed embodiments, the transmission media over which traffic is carried in the optical channel may include multiple spans, the multiple spans including optical fibers of two or more optical fiber types. Determining the symbol rate may include determining respective portions of the transmission media including optical fibers of each of the two or more optical fiber types and calculating the symbol rate dependent on the respective portions of the transmission media including the optical fibers of each of the two or more optical fiber types.

In any of the disclosed embodiments, the transmission media over which traffic is carried in the optical channel may include multiple spans, the multiple spans including optical fibers of two or more optical fiber types. Determining the symbol rate may include determining a ratio of a total length of spans including optical fibers of a first optical fiber type and a total length of spans including optical fibers of a second optical fiber type and obtaining the symbol rate from a data structure in which symbol rates are mapped to respective ratios of the total length of spans including optical fibers of the first optical fiber type and the total length of spans including optical fibers of the second optical fiber type.

In any of the disclosed embodiments, the method may also include obtaining, from a data structure, routing information for the optical channel. The method may also include determining, dependent on the routing information, one or more of the given target distance, the given maximum data rate, and the one or more characteristics of transmission media over which traffic is carried in the optical channel.

In any of the disclosed embodiments, determining a symbol rate for the optical channel may be further dependent on a desired or expected optical noise-to-signal ratio margin for the optical channel.

In any of the disclosed embodiments, the method may also include detecting a topology change in the adaptive optical network and in response to the detected topology change, selecting a different modulation format for the optical channel, determining a different symbol rate for the optical channel, determining a different number of subcarriers for the optical channel corresponding to the different symbol rate, and re-configuring at least one of the one or more optical transponders to transmit or receive the traffic in the optical channel using the different modulation format and the different number of subcarriers.

In any of the disclosed embodiments, the method may also include selecting a modulation format for another optical channel having another target distance or another maximum data rate, the selected modulation format having the highest spectral efficiency among one or more of a plurality of modulation formats supported in the adaptive optical network that are suitable for optical channels having the other target distance or the other maximum data rate. The method may also include determining a symbol rate for the other optical channel dependent on one or more characteristics of transmission media over which traffic is carried in the other optical channel, determining a number of subcarriers for the other optical channel corresponding to the determined symbol rate for the other optical channel, and activating subcarrier multiplexing for the other optical channel, the activating including configuring one or more other optical transponders to transmit or receive the traffic in the other optical channel using the modulation format selected for the other optical channel and the number of subcarriers determined for the other optical channel. At least one of the modulation format selected for the other optical channel and the number of subcarriers determined for the other optical channel may be different than the modulation format selected for the given optical channel and the number of subcarriers determined for the given optical channel, respectively.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
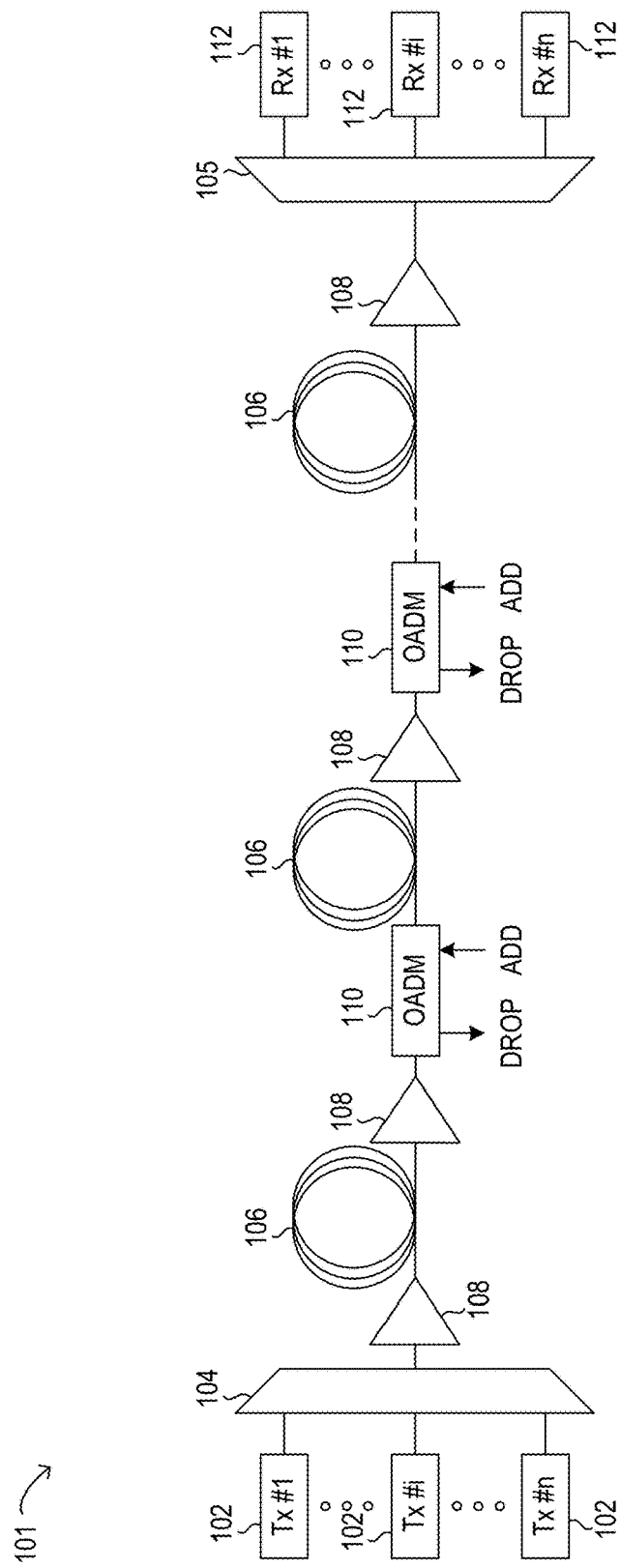
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, widget "72-1" refers to an instance of a widget class, which may be referred to collectively as widgets "72" and any one of which may be referred to generically as a widget "72".

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

As the demand for transmission capacity across optical networks increases, various transmission techniques have been employed to increase the transmission capacity. For example, advanced modulation formats have been introduced that increase the capacity per wavelength channel transmitted. For example, 16-QAM is a modulation format that can carry about 2 times as much information as using QPSK over the same wavelength channel. However, modulation formats that provide greater information density generally result in decreased transmission reach, which results in economic constraints on transmission capacity in the form of a trade-off between transmission reach and transmission capacity. In another example, the advent of multi-carrier channel technology has decreased susceptibility to fiber nonlinearity, which is a limiting factor for optical network transmission, due to the lowered baud rate (symbol rate) of each subcarrier in the multi-carrier channel.

As will be disclosed in further detail, reach extension of optical channels in an adaptive optical network may be accomplished through control of their respective modulation formats and numbers of subcarriers. The methods and systems described herein for reach extension of optical channels may allow a given optical channel to transmit optical signals with the highest spectral efficiency and longest reach extension possible given the target distance for the optical channel, the modulation formats supported by the optical transponders in the network, the transmission media for the optical channel, and the ability (or lack thereof) to activate subcarrier multiplexing for the optical channel. The systems and methods described here may enable the optimization of power consumption various digital signal processors (DSPs) within the optical transponders, which may reduce overall power consumption in the optical network. The methods and systems described herein for reach extension of optical channels may be implemented using a universal programmable transponder, such as a transmitter or a receiver for single carrier and multi-carrier subcarriers, which is controlled by a central network management system.

Referring now to the drawings, FIG. 1 illustrates an example embodiment of optical transport network (OTN) 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm spacing and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Advancements in DWDM enable combining several optical carriers to create a composite optical signal of a desired capacity. One such example of a multi-carrier optical signal is a superchannel, which is an example of high spectral efficiency (SE) that may attain transmission rates of 100 Gbit/s, 400 Gbit/s, 1 Tbit/s, or higher. In a superchannel, a plurality of subcarriers (or subchannels or channels) is densely packed in a fixed bandwidth band and may be transmitted at very high data rates. Furthermore, the superchannel may be well suited for transmission over very long distances, such as hundreds of kilometers, for example. A typical superchannel may comprise a set of subcarriers that are frequency multiplexed to form a single channel that are transmitted through an optical transport network as one entity. The subcarriers within the superchannel may be tightly packed to achieve high spectral efficiency.

In particular embodiments, Nyquist frequency-division multiplexing (N-FDM) may be used in a channel. In N-FDM, optical pulses having a nearly rectangular spectrum are packed together in the frequency domain with a bandwidth approaching the baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101 (see also FIG. 4A). In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain (see also FIG. 5A). Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (m-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As noted above, the transmission reach of an optical channel may be limited by the use of higher order modulations formats. In at least some embodiments, the systems and methods described herein may be used to increase transmission signal reach in an optical transmission system that utilizes digital subcarrier multiplexing (SCM). As will be described in further detail herein, the methods may include selecting, within the optical transmission system, a specific modulation format and a specific number of subcarriers to achieve the highest spectral efficiency and the longest reach for a particular optical channel. Selection of the number of subcarriers for a given optical channel may be dependent on the optical fiber type, the selected modulation format, and the delivered reach extension, among other considerations.

In at least some embodiments, the method for implementing reach extension may include selecting, from among multiple supported modulation formats, the modulation format with the highest spectral efficiency suitable for an optical channel with a given target distance and a given maximum data rate. The method may also include determining an optimum symbol rate, and a corresponding number of subcarriers for the given optical channel, based at least on the number and length of spans in the optical channel, and fiber characteristics for each fiber type over which traffic is carried in the optical channel. When the optimum number of subcarriers is greater than one, the method may also include activating digital subcarrier multiplexing, which may include configuring transponders associated with the given optical channel to transmit and/or receive optical signals using the selected modulation format and the determined optimum number of subcarriers. For example, the DSPs in the transponders may be controlled by software operating on a central network management system in the optical transmission system to configure them for operation using the selected modulation format and the determined optimum number of subcarriers. In at least some embodiments, use of the disclosed techniques may result in better network utilization and reduced power consumption for multi-carrier systems.

Figure 2:
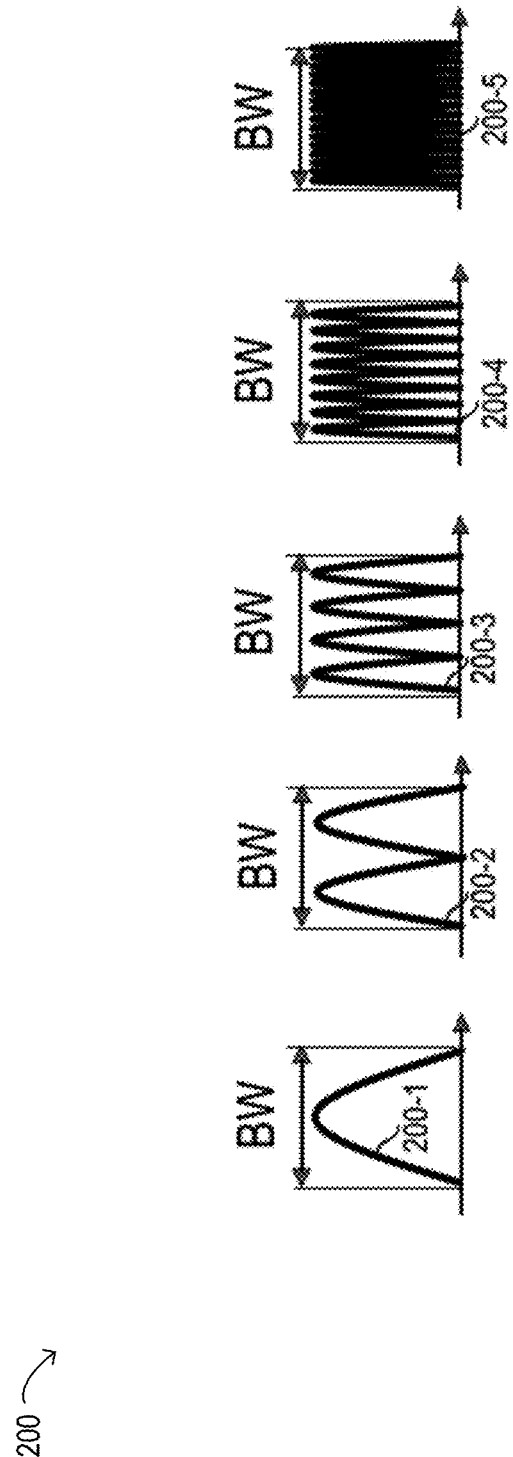
FIG. 2 depicts example spectra of single carrier and multi-carrier channels.

Referring to FIG. 2, selected embodiments of an optical channel are shown as power spectra 200, which depicts five (5) spectra for respective single carrier and multi-carrier channels. For example, a single carrier signal may be generated by a single transmitter. A multi-carrier signal may be generated by a single transmitter where it is electrically (e.g., in a DSP) split into a given number of subcarriers. Spectra 200 are shown in a schematic representation that is not drawn to scale. Specifically, spectrum 200-1 shows a single carrier channel having a bandwidth BW. When the bandwidth is 35 GHz, for example, the single channel in spectrum 200-1 may have a 32 Gbaud symbol rate. Spectrum 200-2 shows a multi-carrier channel having 2 subcarriers. When the bandwidth is 35 GHz, each of the subcarriers in spectrum 200-2 may have a 16 Gbaud symbol rate. Spectrum 200-3 shows a multi-carrier channel having 4 subcarriers. When the bandwidth is 35 GHz, each of the subcarriers in spectrum 200-3 may have an 8 Gbaud symbol rate. Spectrum 200-4 shows a multi-carrier channel having 8 subcarriers. When the bandwidth is 35 GHz, each of the subcarriers in spectrum 200-4 may have a 4 Gbaud symbol rate. Spectrum 200-5 shows a multi-carrier channel having 16 subcarriers. When the bandwidth is 35 GHz, each of the subcarriers in spectrum 200-5 may have a 2 Gbaud symbol rate. The multi-carrier channels may be generated using a single transmitter with a DSP that can split the optical channel into the desired number of subcarriers. It is noted that the channel bandwidth BW and the optical power remains the same for the optical channel, whether transmitted as a single carrier channel or as a multi-carrier channel.

The nonlinear interactions between subcarriers of a multi-carrier channel may include phenomena such as cross-phase modulation (XPM), self-phase modulation (SPM), and four-wave mixing, among others. Cross-phase modulation may occur when phase information, amplitude information, or both from one subcarrier is modulated to an adjacent subcarrier in the multi-carrier channel. Self-phase modulation may arise when a variation in the refractive index (or a dependency of the refractive index on intensity) results in a phase shift within each subcarrier. In four-wave mixing (FWM), three wavelengths may interact to create a fourth wavelength that may coincide with a wavelength of a subcarrier, and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a multi-carrier channel.

In particular embodiments, more than one multi-carrier channel may be transmitted simultaneously. For example, any of the multi-carrier channels shown in FIG. 2 may be transmitted along with another multi-carrier channel. In this case, a guard band may be applied between the first multi-carrier channel and the second multi-carrier channel to mitigate nonlinear interactions in the fiber.

Figure 3:
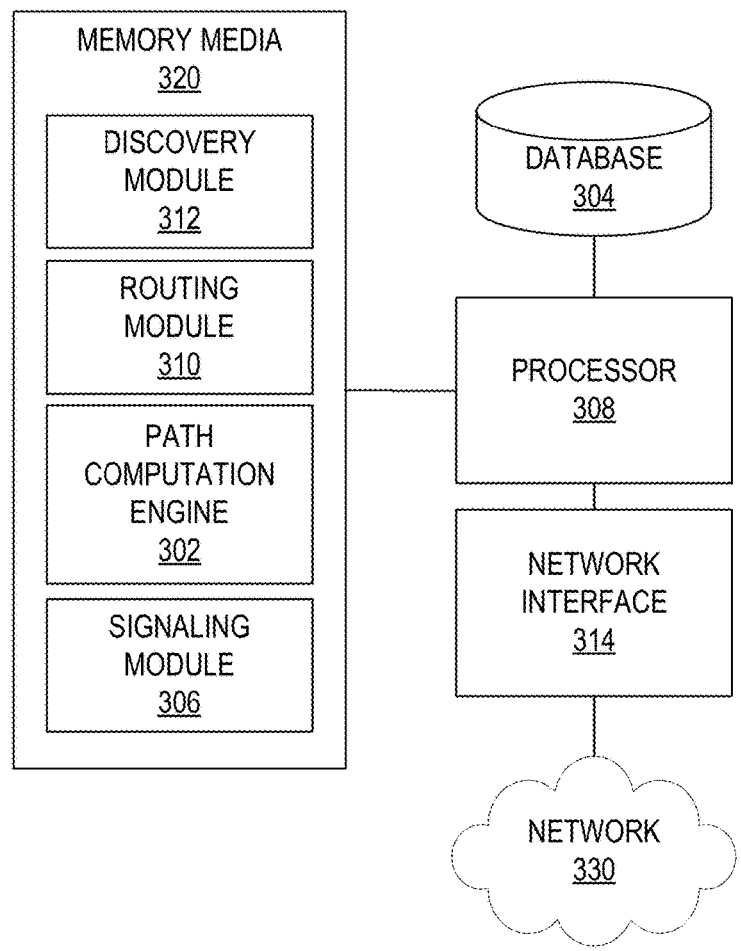
FIG. 3 is a block diagram of selected elements of an embodiment of a network management system for an adaptive optical network.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, after an optical channel has been provisioned, network management system 300 may configure the optical channel to increase the transmission reach of the optical channel. In some embodiments, path computation engine 302, or another element of network management system 300, may be operable to select, within the optical transmission system, a specific modulation format and a specific number of subcarriers to achieve the highest spectral efficiency and the longest reach for the optical channel. Selection of the number of subcarriers for the optical channel may be dependent on the optical fiber type, the selected modulation format, and the delivered reach extension, among other considerations.

Figure 4A:
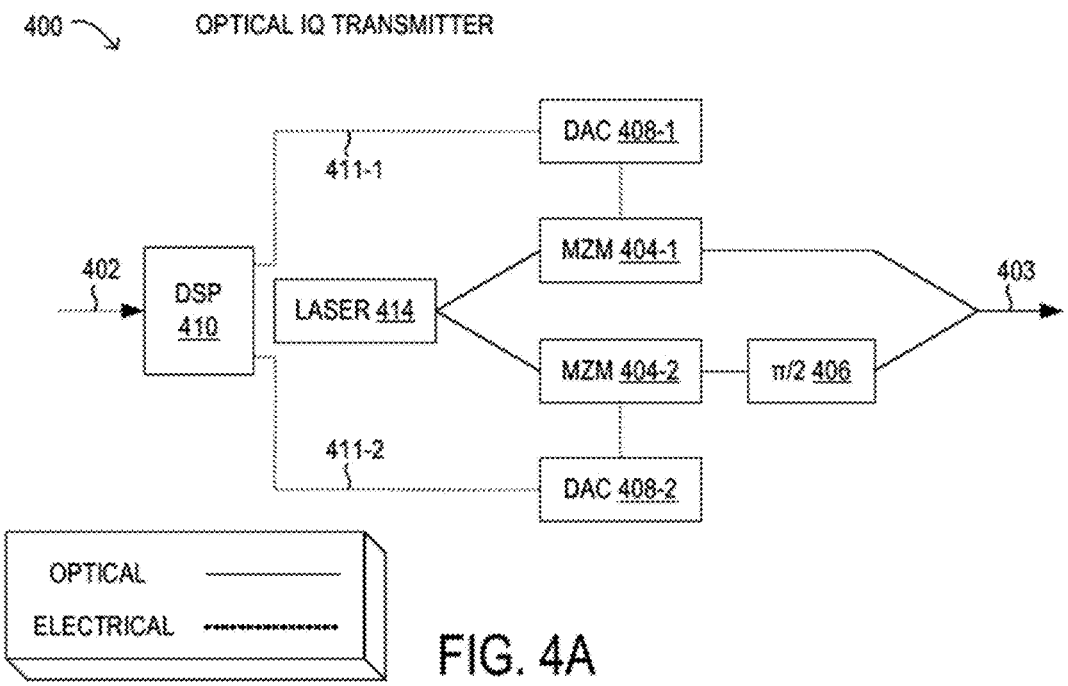
FIG. 4A is a block diagram of selected elements of an embodiment of an optical IQ transmitter, according to one embodiment.

Referring now to FIG. 4A, a block diagram of selected elements of an embodiment of an optical IQ transmitter 400 is shown. Transmitter 400 may be an embodiment of transmitter 102 in FIG. 1. Transmitter 400 is a schematic representation and is not drawn to scale. In various embodiments, transmitter 400 may be implemented with fewer or more elements than depicted. Dashed lines in FIG. 4A represent electrical signals, including digital data logically represented by electrical signals, while solid lines represent optical signals.

As shown, transmitter 400 may receive data 402 as an input signal for transmission at digital signal processor (DSP) 410, which may include (or have access to) a memory storing instructions executable by DSP 410. DSP 410 may generate real (I) portion 411-1 and imaginary (Q) portion 411-2 of the data 402 for optical modulation that are converted to analog signals by digital to analog converters (DAC). As shown, transmitter 400 includes Mach-Zehnder modulators (MZM) 404 that perform amplitude modulation using laser 414 as an optical source. Specifically, real (I) portion 411-1 is converted from digital data to an analog modulation signal by DAC 408-1 that is fed to MZM 404-1. At the same time, imaginary (Q) portion 411-2 is converted from digital data to an analog modulation signal by DAC 408-2 that is fed to MZM 404-2. After applying a π/2 phase shift 406 to the output of MZM 404-2, the optical signals are combined to generate optical signal 403.

Figure 4B:
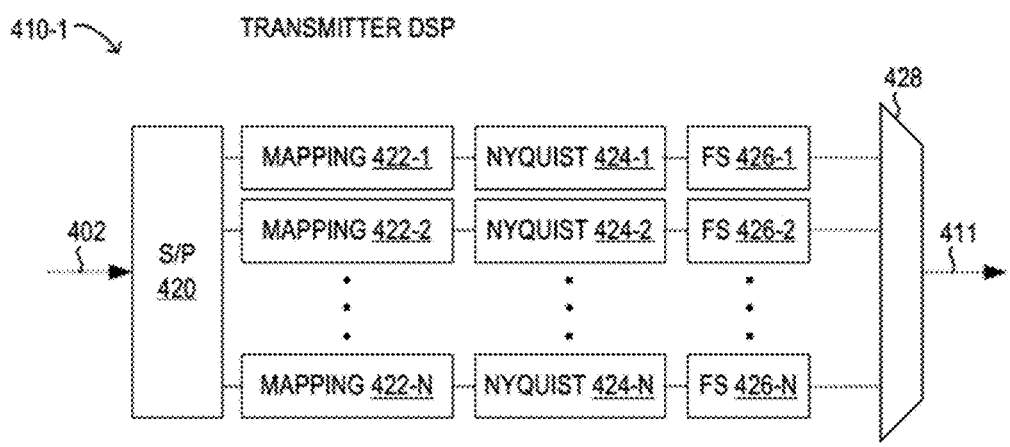
FIG. 4B is a block diagram of selected elements of an embodiment of a transmitter DSP, according to one embodiment.

In FIG. 4B, further details of an embodiment of DSP 410-1 are shown. DSP 410-1 may receive data 402 and then may perform serial-to-parallel conversion (S/P) 420 on data 402, such that each subcarrier portion of data 402, from 1 to N subcarriers, is subsequently processed in parallel. It is noted that in some embodiments, DSP 410-1 may include a field-programmable gate array (FPGA) for performing at least some of the functionality described herein. For each subcarrier 1 to N, DSP 410-1 may then perform symbol mapping 422 and Nyquist filtering 424 before frequency shifting (FS) 426 is applied. Then, at subcarrier multiplexer 428, the individual subcarrier data are combined into signal portion 411, which may be either real (I) portion 411-1 or imaginary (Q) portion 411-2.

Figure 5A:
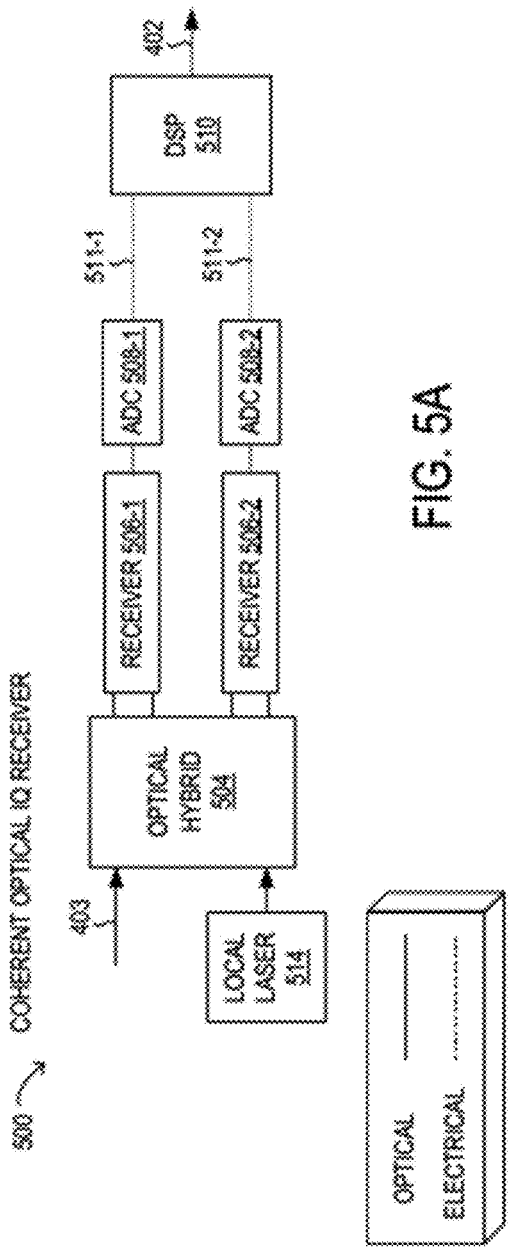
FIG. 5A is a block diagram of selected elements of an embodiment of an optical IQ receiver, according to one embodiment.

Referring now to FIG. 5A, a block diagram of selected elements of an embodiment of an optical IQ receiver 500 is shown. Receiver 500 may be an embodiment of receiver 112 in FIG. 1. Receiver 500 is a schematic representation and is not drawn to scale. In various embodiments, receiver 500 may be implemented with fewer or more elements than depicted. Dashed lines in FIG. 5A represent electrical signals, including digital data logically represented by electrical signals, while solid lines represent optical signals.

As shown in FIG. 5A, receiver 500 may receive optical signal 403 as input, for example, after transmission in an optical network. Optical signal 403 along with a local laser 514 may be received at optical hybrid 504. Optical hybrid 504 may be a 90° optical hybrid that mixes optical signal 403 into four quadrature states with local laser 514 used as a reference signal. The respective outputs of optical hybrid 504 may be fed as a real component to receiver 506-1 and as an imaginary component to receiver 506-2. Receivers 506 may be balanced receivers that perform coherent signal demodulation and also may perform optical power monitoring. After digitization by ADCs 508-1 and 508-2 respectively, DSP 510 receives real signal portion 511-1 and imaginary signal portion 511-2 of optical signal 403. DSP 510 may be used to extract the amplitude and phase information for each subcarrier to regenerate data 402. After data 402 is generated, a BER may be calculated.

Figure 5B:
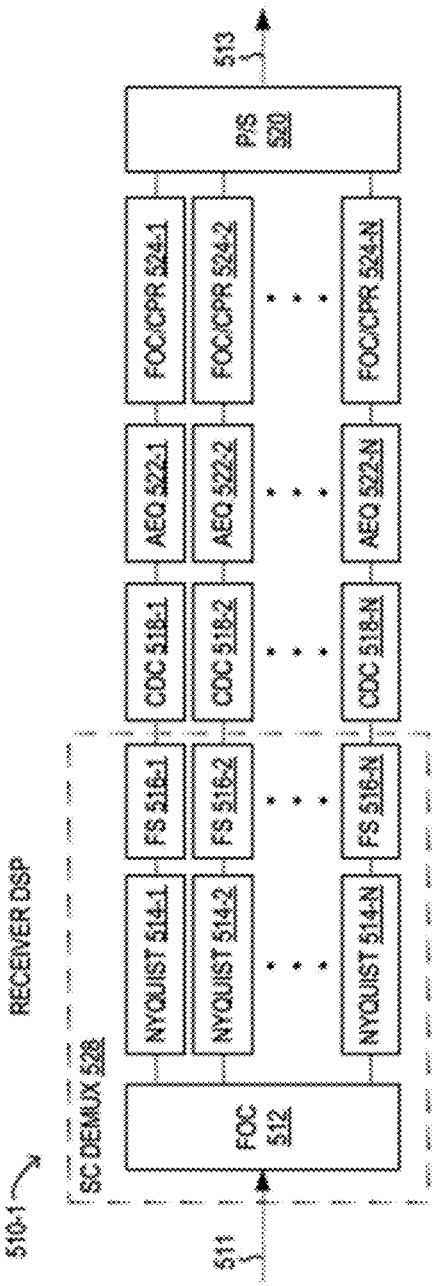
FIG. 5B is a block diagram of selected elements of an embodiment of a receiver DSP, according to one embodiment.

In FIG. 5B, further details of an embodiment of DSP 510-1 are shown. DSP 510-1 may receive signal portion 511 and then may perform frequency offset compensation 512 on signal portion 511, such that each subcarrier portion of signal portion 511, from 1 to N subcarriers, is subsequently processed in parallel. It is noted that in some embodiments, DSP 510-1 may include a field-programmable gate array (FPGA) for performing at least some of the functionality described herein. For each subcarrier 1 to N, DSP 510-1 may then perform Nyquist filtering 514 before frequency shifting (FS) 516 is applied. FOC 512, Nyquist filtering 514 and FS 516 may represent a subcarrier demultiplexer 528. Then, for each subcarrier 1 to N, chromatic dispersion compensation (CDC) 518 may be performed, followed by a constant modulus algorithm (CMA)-based adaptive equalization (AEQ) 522, and followed by FOC/carrier phase recovery (CPR) 524. Then, at parallel-to-serial converter 520, the signal portion 513, corresponding to one of the real or imaginary portion, is generated. Within DSP 510, the real and imaginary signal portions 513 may then be combined to generate data 402.

Some existing systems implement methods for extending the transmission reach of various optical channels including, for example, subcarrier power pre-emphasis of optical superchannels, probabilistic constellation shaping, or non-linearity mitigation using digital back-propagation (DBP). For example, some existing DSP devices include circuitry for implementing nonlinearity mitigation. However, existing techniques provide mitigation of nonlinearity only for a single channel, not for WDM signals. The techniques described herein may be used to select the optimum number of subcarriers in an optical channel for extended reach within SCM systems.

As illustrated in FIG. 2 and described above, the total optical spectrum of a multi-carrier channel may occupy the same bandwidth as a single carrier channel (e.g., 35 GHz in the example illustrated in FIG. 2). However, the spectral efficiency, which refers to the amount of information transmitted over a given bandwidth, may be different depending on the modulation format and the number of subcarriers. In the example illustrated in FIG. 2, if the single carrier channel represented by optical spectrum 200-1 transmits traffic using QPSK at a symbol rate of 32 Gbaud, the data rate may be 100 Gbit/s. When digital subcarrier multiplexing is activated, each subcarrier will have a lower symbol rate (e.g., a 2 Gbaud symbol rate for each of 16 subcarriers, or an 8 Gbaud symbol rate for each of 4 subcarriers), but the total symbol rate for the optical channel is the same as in the single carrier channel case (32 Gbaud) and the total bandwidth occupied is the same as in the single carrier channel case (35 GHz).

In the illustrated example, the optical network that includes optical channel may include a 32 Gbaud transponder with a transmitter DSP that performs Nyquist pulse shaping, which is largely rectangular pulse shaping. The transmitter DSP may also be operable to generate multi-carrier signals. For example, FIG. 4B illustrates a transmitter DSP 410-1 in which a high data rate signal is split into multiple lower data rate subcarriers on which mapping, Nyquist shaping, and frequency shaping are performed as described above. Similarly, a receiver DSP (such as receiver DSP 510-1 illustrated in FIG. 5B) splits the high data rate signal it receives into multiple subcarrier signals and processes each subcarrier signal separately. In this way, the optical transport system may see a high data rate signal as one single channel, although it may include multiple subcarrier signals.

Previous research has found that an optimum symbol rate (or baud rate) exists for each optical channel in an optical transmission system and that this optimum symbol rate is dependent primarily on characteristics of the underlying transmission media. More specifically, the optimum symbol rate (baud rate) is dependent on the group velocity dispersion parameter ($\beta_2$) for the optical fiber, the span length ($L_{span}$), and the number of spans ($N_{span}$), as follows:

$$R_{opt} = \sqrt{2/(\pi |\beta_2| L_{span} N_{span})}$$

In one example, a typical single-mode optical fiber (SMF fiber) may have a fiber dispersion coefficient as follows:

$$D_{fiber} = 16.6 \text{ ps/nm/km}$$

In another example, a non-zero dispersion-shifted fiber (NZ-DSF fiber) may have a much lower fiber dispersion coefficient, as follows:

$$D_{fiber} = 4.4 \text{ ps/nm/km}$$

Figures 6A, 6B:
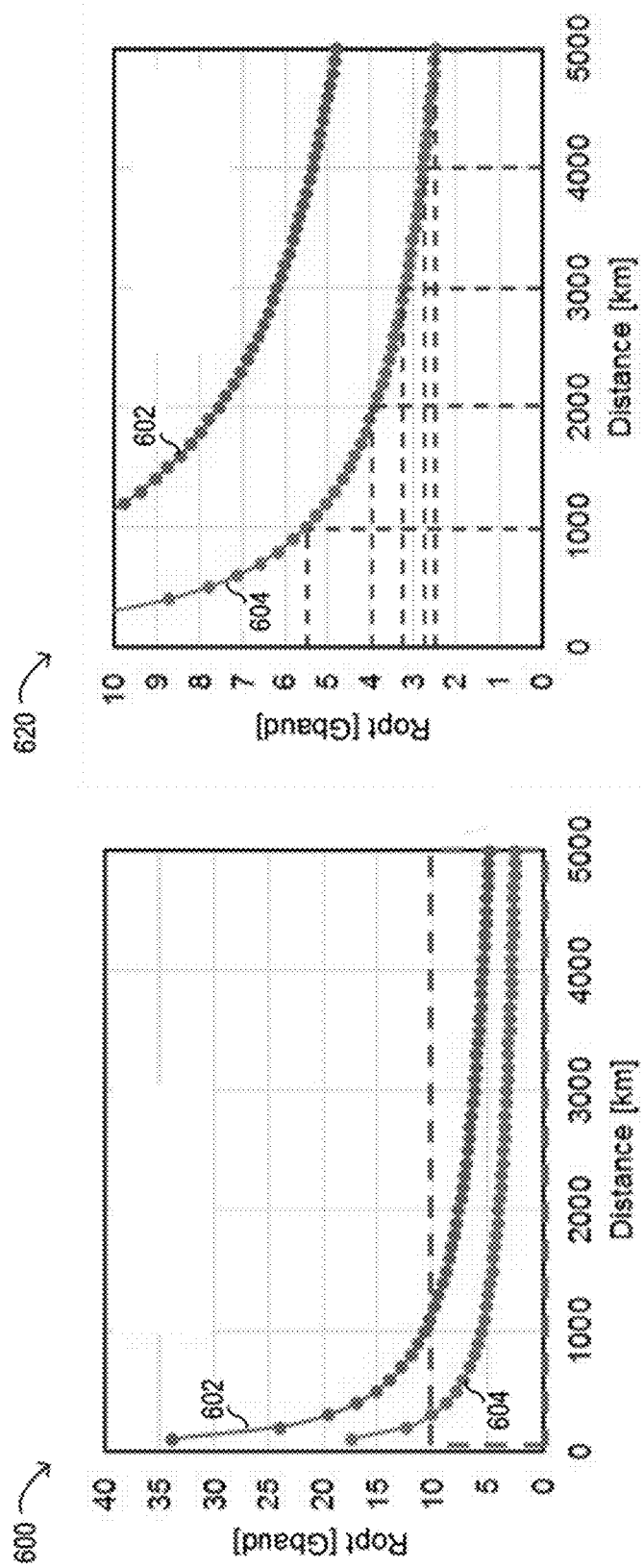
FIGS. 6A and 6B illustrate the relationship between a calculated optimum symbol rate and transmission reach for optical fibers of two different types, according to one embodiment.

FIGS. 6A and 6B are graphs illustrating the relationship between a calculated optimum symbol rate or baud rate, $R_{opt}$ (in terms of GBaud), and transmission reach or distance (in kilometers) for optical fibers of two different types, according to one embodiment. Graph 620 in FIG. 6B depicts a magnified version of the portion of graph 600 representing optimum symbol rates of Gbauds or less, as partially outlined by a dashed line in FIG. 6A. In graph 600 shown in FIG. 6A and in graph 620 shown in FIG. 6B, each point along line 602 represents the calculated optimum symbol rate for a respective distance for an NZ-DSF fiber, and each point along line 604 represents the calculated optimum symbol rate for a respective distance for an SMF fiber.

Graphs 600 and 620 illustrate that the optimum symbol rate for an optical channel decreases as the target distance for the optical channel increases. For example, for a target distance of 2,000 kilometers and an SMF fiber, the optimum symbol rate may be 4 Gbaud. However, if the target distance is 4,000 kilometers, the optimum symbol rate for an optical channel carried on an SMF fiber may be approximately 2.7 Gbaud.

Graphs 600 and 620 also illustrate that the optimum symbol rates for optical channels carried over optical fibers of different types are different for the same target distance. For example, the optimum symbol rate for an optical channel carried over an NZ-DSF fiber at a target distance of 5000 kilometers may be 5.5 Gbaud, while the optimum symbol rate for an optical channel carried over an SMF fiber at the same target distance may be approximately 2.4 Gbaud. The systems and methods described herein may select an appropriate symbol rate for a given optical channel based on the fiber type and the target distance.

As described above, the optimum symbol rate for a given optical channel may be modulation format independent. However, reach extension due to activation of digital subcarrier multiplexing is dependent on modulation format. For example, the maximum possible reach extension for optical channels operating with lower order modulation formats, such as DP-QSPK, is larger than the maximum possible reach extension for optical channels operating with higher order modulation formats, such as DP-16-QAM. In addition, the higher order modulation formats have limited reach in general, regardless of whether digital subcarrier multiplexing is activated. In at least some embodiments, the systems and method described herein may be used to select, for a given optical channel, the modulation format and the number of subcarriers that achieves the highest spectral efficiency and longest reach, leading to better overall network utilization. As described in more detail below, the optimum number of subcarriers may be dependent on the fiber type, the modulation format, and the delivered reach extension.

In some embodiments, a path computation engine (such as path computation engine 302 illustrated in FIG. 3) or another element of a network management system (such as network management system 300) may be operable to select, for a given optical channel, a suitable modulation format with the highest possible spectral efficiency, to determine the optimum symbol rate (and corresponding number of subcarriers), and to send instructions to the transponders for the given optical channel (e.g., to DPSs within the transponders) to activate digital subcarrier multiplexing, when necessary. For example, the transponders may support multiple modulation formats with and without digital subcarrier multiplexing and may be configurable or reconfigurable by the network management system, e.g., during initialization of the optical network and/or during operation of the optical network. In one example, each of the transponders may support QPSK, 8-QAM, and 16-QAM, among other modulation formats, with or without polarization, and may also include the option to implement these modulation formats with subcarrier multiplexing activated. In some embodiments, instructions sent by the network management system to the transponders may indicate the selected modulation format and the specific number of subcarriers to be generated based at least on the selected modulation format, optimum symbol rate, and target reach.

Existing optical transport networks are typically configured as fixed (static) networks. These optical networks are often designed for worst case, end-of-life scenarios, with system margin requirements that ensure the longest possible reach even as the components of the optical network age. For example, they may be designed with optical signal-to-noise ratio (OSNR) margins, which represent the difference between the actual OSNR value and the threshold OSNR value beyond which all errors are recoverable, that allow the networks to operate without errors for many years. In these optical networks, optical transmission paths on all wavelengths might reach their destinations. However, these networks may exhibit poor network capacity, with large amounts of unused margin for short reach optical transmission paths and in start-of-life scenarios. In one example, the threshold OSNR value may be identified as being 1 dB from the FEC threshold for the optical path, which represents a threshold below which all bit errors are successfully identified and corrected at the transponders.

In some embodiments, the systems and methods described herein may be used to implement flexible and dynamic optical networks, rather than fixed optical networks with large amounts of wasted margin. These flexible and dynamic optical networks may provide optical transmission channels with higher spectral efficiency than traditional fixed networks and the longest reach possible, with little or no wasted margin. These networks may be dynamically configured as nodes and links are added to and removed from the network. For each new or modified optical channel, the network management system may be operable to select, for the new or modified optical channel, a suitable modulation format with the highest possible spectral efficiency, to determine the optimum symbol rate (and corresponding number of subcarriers) for the new or modified optical channel, and to send instructions to the transponders for the new or modified optical channel to configure them accordingly. In at least some embodiments, this approach to implementing software control of the DSPs in the transponders of SCM systems may be used to optimize or reduce DSP power consumption in multi-carrier systems by lowering the symbol rates for subcarrier signals.

Figure 7:
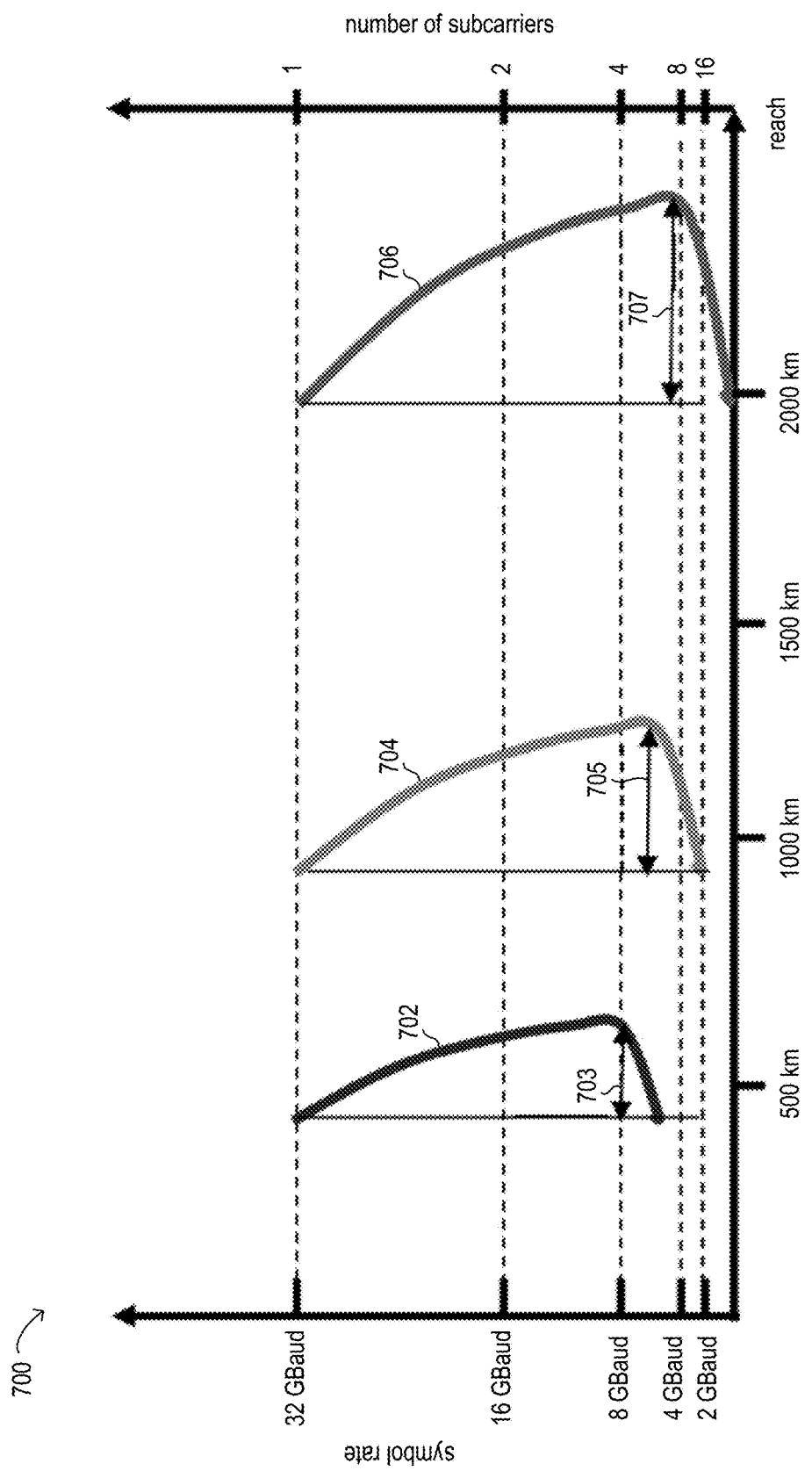
FIG. 7 illustrates examples of reach extensions that are possible for particular optical channels, according to one embodiment.

FIG. 7 is a graph 700 illustrating examples of reach extensions that are possible for particular optical channels, according to one embodiment. In a first example, curve 702 represents a 32 Gbaud DP-16-QAM modulated optical signal that is transmitted using a 35 GHz bandwidth optical channel. For this transmission, the 35 GHz bandwidth for the optical channel may be allocated to 1 subcarrier at 32 Gbaud (single carrier), 2 subcarriers at 16 Gbaud (multi-carrier), 4 subcarriers at 8 Gbaud (multi-carrier), 8 subcarriers at 4 Gbaud (multi-carrier), or 16 subcarriers at 2 Gbaud (multi-carrier), for example.

In a second example, curve 704 represents a 32 Gbaud DP-8-QAM modulated optical signal that is transmitted using a 35 GHz bandwidth optical channel. As with the first example, the 35 GHz bandwidth for the optical channel may be allocated to 1 subcarrier at 32 Gbaud (single carrier), 2 subcarriers at 16 Gbaud (multi-carrier), 4 subcarriers at 8 Gbaud (multi-carrier), 8 subcarriers at 4 Gbaud (multi-carrier), or 16 subcarriers at 2 Gbaud (multi-carrier), for example.

In a third example, curve 706 represents a 32 Gbaud DP-QPSK modulated optical signal that is transmitted using a 35 GHz bandwidth optical channel. Here again, the 35 GHz bandwidth for the optical channel may be allocated to 1 subcarrier at 32 Gbaud (single carrier), 2 subcarriers at 16 Gbaud (multi-carrier), 4 subcarriers at 8 Gbaud (multi-carrier), 8 subcarriers at 4 Gbaud (multi-carrier), or 16 subcarriers at 2 Gbaud (multi-carrier), for example.

As shown by curve 706 in FIG. 7, with DP-QPSK, a single carrier transmitting and receiving traffic with a symbol rate of 32 Gbaud can easily reach 2000 km. When the number of subcarriers is increased, resulting in a corresponding decrease in the symbol rates for each subcarrier signal, the transmission reach is extended. In this example, the maximum reach extension is shown as $\Delta L_3$ (707) and may be achieved using 8 subcarriers, each transmitting and receiving traffic with a symbol rate of approximately 4 Gbaud.

As shown by curve 702 in FIG. 7, with DP-16-QAM, a single carrier transmitting and receiving traffic with a symbol rate of 32 Gbaud has a reach of approximately 400 km. The maximum reach extension in this case is shown as $\Delta L_1$ (703) and may be achieved using 4 subcarriers, each transmitting and receiving traffic with a symbol rate of approximately 8 Gbaud.

As shown by curve 704 in FIG. 7, with DP-8-QAM, a single carrier transmitting and receiving traffic with a symbol rate of 32 Gbaud has a reach of approximately 750 km. The maximum reach extension in this case is shown as $\Delta L_2$ (705) and may be achieved using 6 subcarriers, each transmitting and receiving traffic with a symbol rate of approximately 5.33 Gbaud.

FIG. 7 illustrates that the maximum possible reach extension for a given optical channel is modulation format dependent. For example, the maximum reach extension achievable with DP-16-QAM, $\Delta L_1$ (703), is much smaller than the maximum reach extension achievable with DP-QPSK, $\Delta L_3$ (707). This is further illustrated in Table 1 below.

TABLE 1

Example reach extensions for SMF fiber links

| Reach | Fiber type | Ropt | Modulation format | Spectral efficiency per polarization | ΔL |
|---|---|---|---|---|---|
| 2000 km | SMF | 4 GBd | DP-QPSK | 2 bits/symbol | 800 km |
| 750 km | SMF | 6 GBd | DP-8-QAM | 3 bits/symbol | 240 km |
| 400 km | SMF | 8 GBd | DP-16-QAM | 4 bits/symbol | 80 km |

As shown in Table 1, with DP-QPSK, the typical reach with SMF fiber links is 2000 kilometers. The reach extension, ΔL, resulting from the activation of SCM with 8 subcarriers would be approximately 800 kilometers. With DP-8-QAM, the typical reach with SMF fiber links is 750 km. In this case, the reach extension, ΔL, resulting from the activation of SCM with 6 subcarriers would be approximately 240 kilometers. With DP-16-QAM, the typical reach with SMF fiber links is 400 kilometers. The reach extension, ΔL, resulting from the activation of SCM with 4 subcarriers would be approximately 80 kilometers.

As shown in Table 1, DP-QPSK has lower spectral efficiency than DP-8-QAM or DP-16-QAM, where spectral efficiency refers to the amount of information that can be carried in a specific bandwidth. Spectral efficiency is sometimes expressed in terms of bits per second per Hz. For example, DP-QPSK carries only 2 bits per symbol per polarization, while DP-16-QAM carries 4 bits per symbol per polarization. Therefore, by using DP-16-QAM, more information can be packed into a given optical channel than by using DP-QPSK.

Referring again to FIG. 7 and Table 1, for an optical channel with a target distance of 600 km, either of the modulation formats DP-8-QAM and DP-QPSK could easily reach the target distance. However, the network management system might select DP-16-QAM due to its higher spectral efficiency. In this case, since single carrier DP-16-QAM cannot reach the target distance, the network management system may send instructions to the transponders for the optical channel to activate digital subcarrier multiplexing. For example, with four subcarriers, each transmitting and receiving traffic with a symbol rate of 8 Gbaud, the target distance of 600 km can be achieved.

In another example, for an optical channel with a target distance of 800 km, the available options include a single carrier DP-8-QAM or DP-8-QAM with four subcarriers, each transmitting and receiving traffic with a symbol rate of 8 Gbaud. In some embodiments, this option may be selected by the network management system to provide extra OSNR margin in addition to providing the additional reach achievable with four subcarriers.

In yet another example, for an optical channel with a target distance of 2200 km, the only available modulation format option is DP-QPSK, which has the lowest spectral efficiency of the supported modulation formats. In this example, the network management system may activate digital subcarrier multiplexing with 8 subcarriers, each transmitting and receiving traffic with a symbol rate of 4 Gbaud. This option may allow the optical channel to achieve the target reach and may even provide additional OSNR margin.

These examples illustrate that, under certain circumstances, the network management system may have a choice between packing higher spectral efficiency into the transmitted signal or not, and may also have the option of extending reach using subcarrier multiplexing to make up for the limited reach typically achievable when using higher order modulation formats. In some embodiments, for an optical channel with a given target distance, the network management system may be operable to first select a modulation format to achieve the highest possible spectral efficiency, and then to determine the optimum number of subcarriers to achieve the given target distance, e.g., with or without extending reach through digital subcarrier multiplexing. Once the modulation format and the number of subcarriers have been determined, the network management system may be operable to send instructions to one or more transponders to configure the optical channel accordingly.

Note that the optimum baud rate in a multi-carrier channel depends on the interplay between single subcarrier nonlinearity, often expressed as self-phase modulation (SPM) and inter-subcarrier nonlinearity, which may originate from cross-phase modulation (XPM) and four-wave mixing (FWM). It has been observed that FWM increases with the number of subcarriers in a multi-carrier channel and is a limiting factor for transmission reach. Therefore, by continuing to increase the number of subcarriers beyond the point at which the maximum reach extension is achieved, the reach may decrease significantly. This is because there would be more interaction between a large number of subcarriers and more four-wave mixing that would kick in, reducing the reach. As illustrated in FIG. 7, the reach extension shown by each of curves 702, 704, and 706 drops off rapidly and dramatically until it reaches zero.

Figure 8:
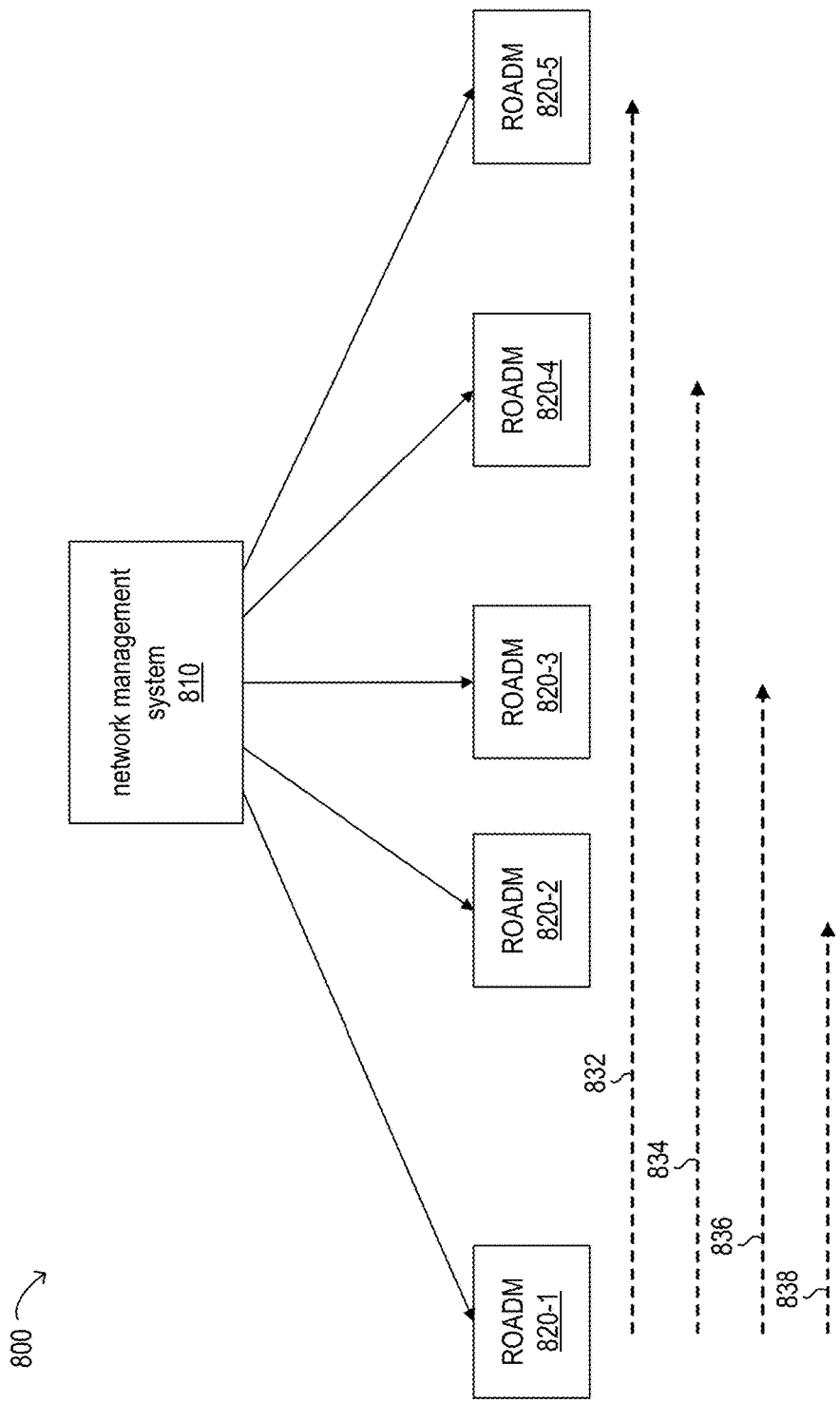
FIG. 8 is a block diagram illustrating an optical network in which multiple optical channels carry traffic using different modulation formats and numbers of subcarriers, according to one embodiment.

FIG. 8 is a block diagram illustrating an optical network in which multiple optical channels of different lengths carry traffic using different modulation formats, according to one embodiment. In this example, optical network 800 includes network management system 810, which may be similar to network management system 300 illustrated in FIG. 3 and described above. Network 800 also includes five ROADMs 820, where the distances between the ROADMs 820 in various pairs of ROADMs 820 are different.

For each of the optical channels between a pair of ROADMs 820, the target transmission reach may be different and the transmission media of each of the links may be different. In this example, network management system 810 may obtain routing information for each optical channel including the target distance, the fiber type, the number of spans, and the length of the spans. Network management system 810 may be operable to select a modulation format for each optical channel that is the modulation format with the highest spectral efficiency among those modulation formats suitable for the target distance for that optical channel. In some cases, network management system 810 may be operable to activate SCM for an optical channel in order to extend reach, increase OSNR margin, and/or reduce power consumption for the optical channel.

In the illustrated example, optical path 838 from ROADM 820-1 to ROADM 820-2 may be short enough that the target distance can be reached using DP-8-QAM without activating SCM. Optical path 836 from ROADM 820-1 to ROADM 820-3 is a little longer than optical path 838. In this case, the target distance can be achieved using DP-8-QAM if SCM is activated to extend the transmission reach for this optical path.

Optical path 834 from ROADM 820-1 to ROADM 820-4 is longer than optical path 836. In this case, the target distance cannot be reached using DP-8-QAM, and the transponders associated with optical path 834 may be configured to use DP-QPSK without activating SCM. In the illustrated example, optical path 832 from ROADM 820-1 to ROADM 820-5 is the longest path shown. In this case, the target distance can be achieved using DP-QPSK if SCM is activated to extend the transmission reach for this optical path.

FIG. 8 illustrates that for a specific target distance, the highest spectral efficiency modulation format and optimum symbol rate may be assigned to an optical channel (with or without activating SCM) in order to enable transmissions to reach the target distance with the highest possible spectral efficiency while meeting a desired OSNR margin.

Figure 9:
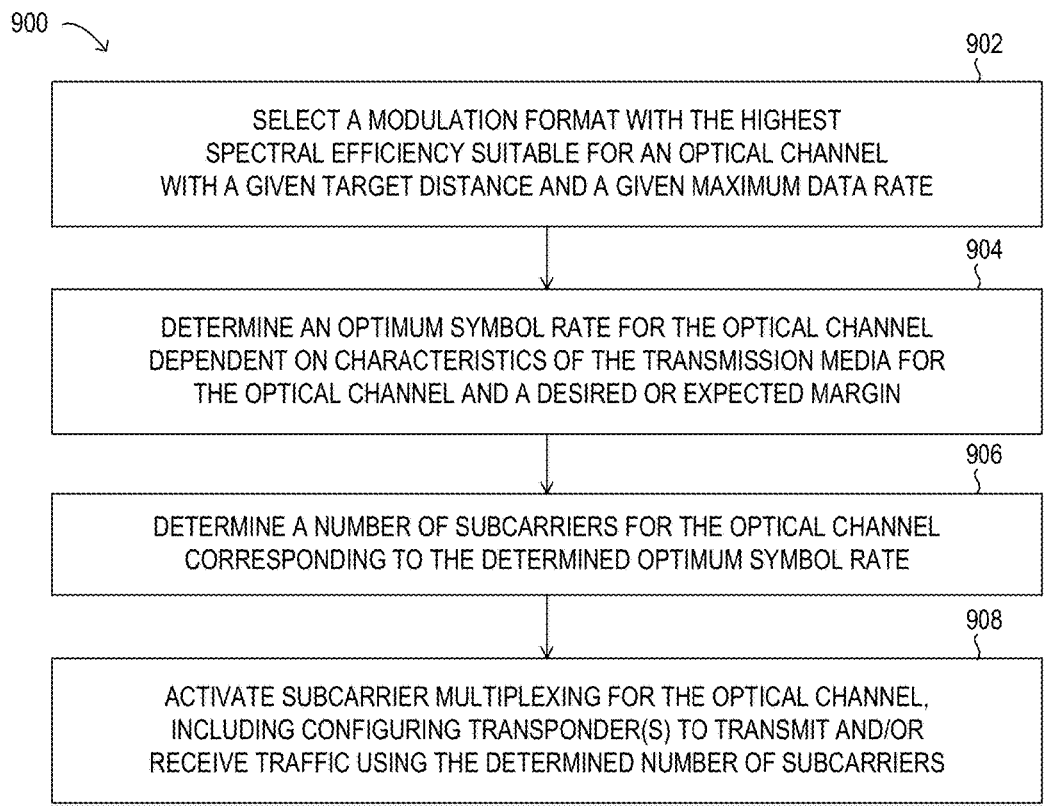
FIG. 9 is a flow chart of selected elements of an example method for implementing transmission reach extension for optical channels through control of their respective modulation formats and numbers of subcarriers.

Referring now to FIG. 9, a flowchart of selected elements of an embodiment of method 900 for implementing transmission reach extension for optical channels through control of their respective modulation formats and numbers of subcarriers, as described herein, is depicted. Some or all of the operations of method 900 may be performed by a network management system (such as network management system 300 illustrated in FIG. 3 or network management system 810 illustrated in FIG. 8), which may communicate with various components in optical transport network 101, as described above. More specifically, one or more of the operations of method 900 may be performed by a path computation engine such as path computation engine 302 illustrated in FIG. 3. It is noted that certain operations described in method 900 may be optional or may be rearranged in different embodiments.

Method 900 may begin at 902 by selecting a modulation format with the highest spectral efficiency suitable for an optical channel with a given target distance and a given maximum data rate. In one example, the modulation format may be selected from among one or more modulation formats supported by the transponders associated with the optical channel for which the typical reach is greater than or equal to the given target distance. In another example, the modulation format may be selected from among one or more modulation formats supported by the transponders associated with the optical channel for which the typical reach is close enough to the given target distance that the target distance may be achieved through the activation of digital subcarrier multiplexing, as described herein.

At 904, the method may include determining an optimum symbol rate for the optical channel dependent on characteristics of the transmission media for the optical channel and a desired or expected margin. In some embodiments, determining the symbol rate for the optical channel may include calculating the symbol rate dependent on a dispersion coefficient of an optical fiber over which the traffic is carried. In some embodiments, determining the symbol rate for the optical channel may include calculating the symbol rate dependent on the number of spans over which the traffic is carried and/or the respective length of each of the spans over which the traffic is carried. In some embodiments, determining the symbol rate for the optical channel may include calculating the symbol rate dependent on a desired or expected OSNR margin. In some embodiments, determining the symbol rate for the optical channel may include obtaining the symbol rate from a data structure in which symbol rates are mapped to the characteristics of the transmission media.

At 906, the method may include determining a number of subcarriers for the optical channel corresponding to the determined optimum symbol rate. For example, the determined number of subcarriers may be inversely related to the determined optimum symbol rate. As the symbol rate increases, the number of subcarriers decreases proportionately, as described herein. At 908, the method may include activating digital subcarrier multiplexing for the optical channel, which may include configuring (or reconfiguring)

one or more transponders associated with the optical channel to transmit and/or receive traffic using the determined number of subcarriers and the selected modulation format. In some embodiments, the network management system (or a path computation engine or other element thereof) may send control signals to the transmitter DSPs and/or receiver DSPs of the transponders associated with the optical channel instructing them to transmit and/or receive traffic using the determined number of subcarriers and the selected modulation format. The operations illustrated in FIG. 9 may be performed for each optical path in an optical network to configure the optical path to achieve the highest spectral efficiency and the longest reach extension possible for that optical channel.

In some embodiments, the transmission media used to carry traffic over particular optical channels in an optical network may include optical fibers multiple fiber types. There may even be a mix of fiber types for the optical fibers underlying a single optical channel, in some cases. For example, there may be one span comprising an SMF fiber and another spam comprising an NZ-DSF fiber. In some such embodiments, the network management system may consider the fiber mix when selecting a suitable modulation format and/or determining the optimum symbol rate for a given optical path. In some embodiments, the determination of the optimum symbol rate may be dependent on the relative portions of the optical path comprising each fiber type. For example, the determination of the optimum symbol rate may be dependent on the ratio of the length of the spans comprising an SMF fiber and the length of the spans comprising an NZ-DSF fiber.

In some embodiments, if there is one dominant fiber type among multiple fiber types used in an optical path, the network management system may select the optimum symbol rate based on the characteristics of the dominant fiber type without considering the characteristics of other fiber types used in the optical path. In one example, a fiber type may be considered dominant if at least 90% of the total length of the optical path is implemented using that fiber type. The inclusion of one or more spans whose combined length is less than 10% of the total length of the optical path and which are implemented using other fiber types may introduce some small errors in the calculation of the optimum symbol rate. However, most optical networks are designed to include at least some amount of OSNR margin to account for such deviations, or for deviation due to temperature changes, wavelengths shift, or other factors. In some embodiments, an OSNR penalty of 0.5 dB or less resulting from the inclusion of fibers of types other than the dominant fiber type may be acceptable. In other embodiments, different thresholds or criteria may be used in determining whether one fiber type is considered dominant. In some embodiments, the optimum symbol rate for an optical channel with multiple spans of two or more fiber types may be calculated based on the formula shown below. In other embodiments, the optimum symbol rate may be calculated in this manner only if there is no dominant fiber type. In the formula below, the calculation may be performed for an optical channel in which there are fibers of two different types, SMF fibers and NZ-DSF fibers, and neither fiber type is considered dominant.

$$R_{opt} = \sqrt{\frac{2}{\pi(|\beta_{2,SMF}|L_{span(SMF)}N_{span(SMF)} + |\beta_{2,(NZ-DSF)}|L_{span(NZ-DSF)}N_{span(NZ-DSF)})}}$$

In this example, if SMF is considered to be the dominant fiber, the network management system may calculate the optimum symbol rate based on the characteristics of SMF fibers only. Alternatively, if NZ-DSF is considered to be the dominant fiber, the network management system may calculate the optimum symbol rate based on the characteristics of NZ-DSF fibers only.

While the example above describes the calculation of an optimum symbol rate for an optical channel in which each of multiple spans comprises an optical fiber of one of two different optical fiber types, in other embodiments, a similar approach may be used to calculate an optimum symbol rate for an optical channel in which each of multiple spans comprises an optical fiber of one of three or more different optical fiber types. In some embodiments, this formula may be pre-calculated for various fiber mixes or ratios and stored in a data structure (e.g., in the path computation engine). In other embodiments, it may be calculated as needed during operation of the optical network.

Figure 10:
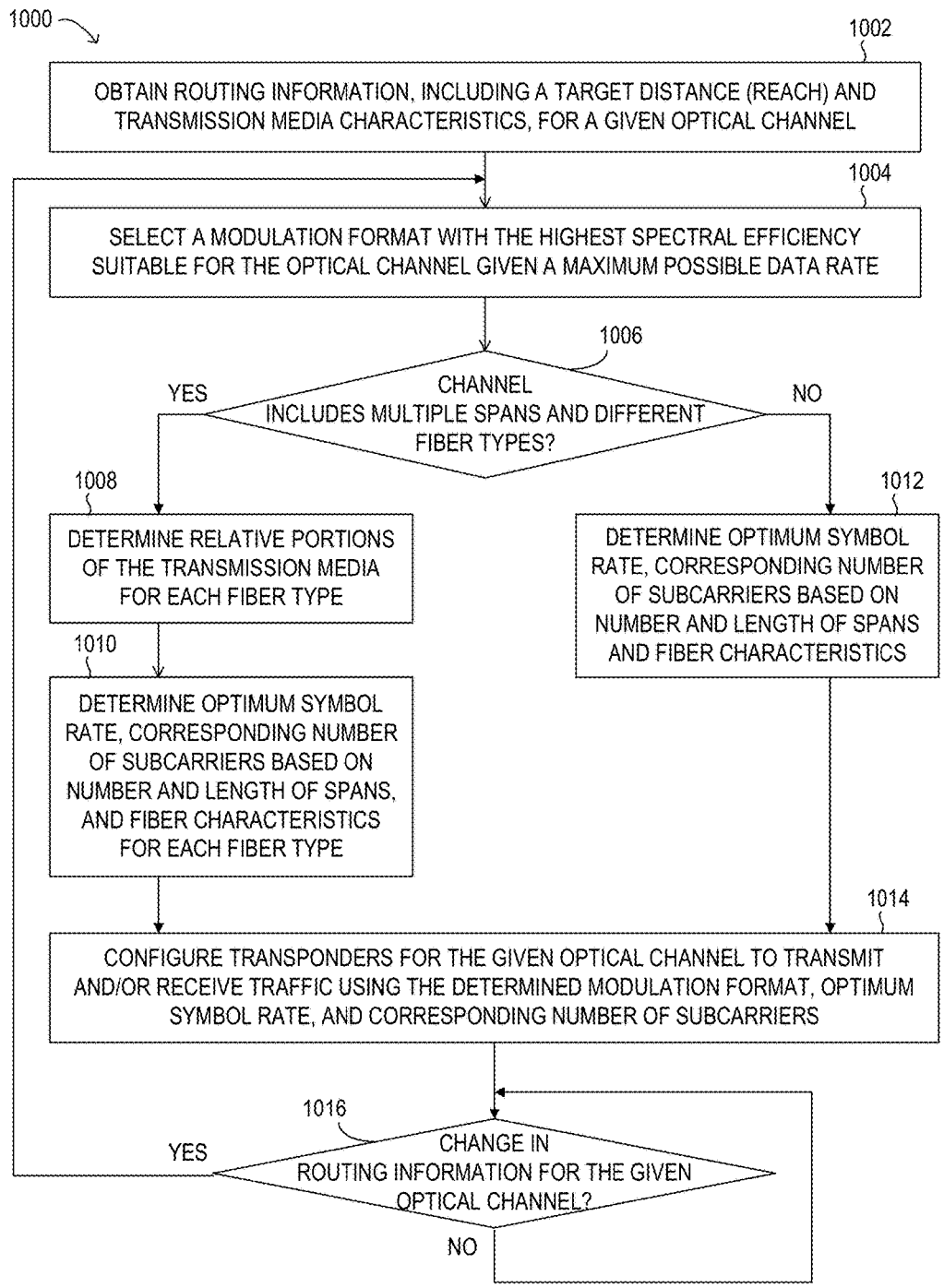
FIG. 10 is a flow chart of selected elements of an example method for selecting a modulation format and number of subcarriers to achieve the highest spectral efficiency and the longest reach extension possible for a given optical channel.

Referring now to FIG. 10, a flowchart of selected elements of an embodiment of method 1000 for selecting a modulation format and number of subcarriers to achieve the highest spectral efficiency and the longest reach extension possible for a given optical channel, as described herein, is depicted. Some or all of the operations of method 1000 may be performed by a network management system (such as network management system 300 illustrated in FIG. 3 or network management system 810 illustrated in FIG. 8), which may communicate with various components in optical transport network 101, as described above. More specifically, one or more of the operations of method 1000 may be performed by a path computation engine such as path computation engine 302 illustrated in FIG. 3. It is noted that certain operations described in method 1000 may be optional or may be rearranged in different embodiments.

Method 1000 may begin at 1002 by obtaining routing information, including a target distance (reach) and transmission media characteristics, for a given optical channel. In one example, the path computation engine may obtain routing information from the transponders associated with the given optical channel and/or may store routing information in a data structure accessible by elements of the network management system. At 1004, the method may include selecting a modulation format with the highest spectral efficiency suitable for the optical channel given a maximum possible data rate, as described herein.

At 1002, in the illustrated embodiment, a decision is made whether the given optical channel includes multiple spans and different fiber types. If so, method 1000 proceeds to 1008. Otherwise, method 1000 proceeds to 1012. At 1008, method 1000 may include determining the relative portions of the transmission media that are made up of each fiber type. In some embodiments, this may include determining a ratio of the total length of the spans comprising optical fibers of a first optical fiber type and the total length of the spans comprising optical fibers of a second optical fiber type.

At 1010, the method may include determining the optimum symbol rate, and the corresponding number of subcarriers, for the given optical channel based on the number and length of spans comprising fibers of each fiber type and the fiber characteristics for each fiber type. In some embodiments, if it is determined that there is a dominant fiber type, the optimum symbol rate may be calculated based on the fiber characteristics of the dominant fiber type. If there is not a dominant fiber type, the optimum symbol rate may be calculated based on the fiber characteristics of multiple fiber types, as described herein.

At 1012, method 1000 may include determining the optimum symbol rate, and the corresponding number of subcarriers, for the given optical channel based on the number and length of spans and the fiber characteristics for the single optical fiber type over which traffic is carried in the given optical channel.

At 1014, after determining the optimum symbol rate for the given optical channel at 1010 or 1012, the method may include configuring one or more transponders for the given optical channel to transmit and/or receive traffic using the determined modulation format, optimum symbol rate, and corresponding number of subcarriers. In some embodiments, the network management system (or a path computation engine or other element thereof) may send control signals to the transmitter DSPs and/or receiver DSPs of the transponders associated with the optical channel instructing them to transmit and/or receive traffic using the determined modulation format, optimum symbol rate, and corresponding number of subcarriers.

At 1016, if and when a change in the routing information for the given channel takes place subsequent to the configuration of the transponders for any of the optical channels in the network (e.g., at any point during operation of the optical network), method 1000 may include repeating at least some of the operations shown as 1002-1014, as appropriate, to reconfigure the transponders for the affected optical channels in response to each such change.

The operations illustrated in FIG. 10 may be performed for each optical path in an optical network to configure and/or reconfigure the optical path to achieve the highest spectral efficiency and the longest reach extension possible for that optical channel.

As described herein, reach extension of optical channels in an adaptive optical network may be accomplished through software control of their respective modulation formats and numbers of subcarriers. The methods and systems disclosed herein for reach extension of optical channels may allow a given optical channel to transmit optical signals with the highest spectral efficiency and longest reach extension possible given the target distance for the optical channel, the modulation formats supported by the optical transponders in the network, the transmission media for the optical channel, and the ability to activate subcarrier multiplexing for the optical channel. This may result in better network utilization than is possible in optical transmission systems that use different reach extension techniques.

The methods and systems described herein for reach extension of optical channels may be implemented using a universal programmable transponder, such as a transmitter or a receiver for single carrier and multi-carrier subcarriers, which is controlled by a central network management system. For an optical channel with a given target distance, the central network management system may be operable to first select a modulation format to achieve the highest possible spectral efficiency, and then to determine the optimum number of subcarriers to achieve the given target distance, with or without extending reach through digital subcarrier multiplexing. Once the modulation format and the number of subcarriers have been determined, the central network management system may be operable to send instructions to one or more transponders to configure the optical channel accordingly. The systems and methods described here may enable the optimization of power consumption various digital signal processors (DSPs) within the optical transponders through the use of lower symbol rate subcarriers, which may reduce overall power consumption in the optical network.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A system for extending reach in an adaptive optical network, the system comprising:
   a plurality of optical transponders; and
   a network management system comprising memory media and a processor having access to the memory media, wherein the memory media store instructions executable by the processor for:
      selecting a modulation format for an optical channel having a given target distance and a given maximum data rate, the selected modulation format having the highest spectral efficiency among one or more of a plurality of modulation formats supported in the adaptive optical network that are suitable for optical channels having the given target distance and the given maximum data rate;
      determining a symbol rate for the optical channel dependent on one or more characteristics of transmission media over which traffic is carried in the optical channel;
      determining a number of subcarriers for the optical channel corresponding to the determined symbol rate; and
      activating subcarrier multiplexing for the optical channel, the activating including sending instructions to one or more of the plurality of optical transponders to transmit or receive the traffic in the optical channel using the selected modulation format and the determined number of subcarriers, wherein
      determining the symbol rate for the optical channel comprises obtaining the symbol rate from a data structure in which the symbol rate is mapped to the one or more characteristics of the transmission media over which the traffic is carried in the optical channel, and
      the one or more characteristics of the transmission media include one or more of:
         a dispersion coefficient of an optical fiber over which the traffic is carried in the optical channel;
         a number of spans over which the traffic is carried in the optical channel; and
         a respective length of each of one or more spans over which the traffic is carried in the optical channel.

2. The system of claim 1, wherein determining the symbol rate for the optical channel further comprises calculating the symbol rate dependent on a dispersion coefficient of an optical fiber over which the traffic is carried in the optical channel.

3. The system of claim 1, wherein:
   the transmission media over which traffic is carried in the optical channel includes multiple spans, the multiple spans comprising optical fibers of two or more optical fiber types; and determining the symbol rate further comprises:
determining respective portions of the transmission media comprising optical fibers of each of the two or more optical fiber types; and
calculating the symbol rate dependent on the respective portions of the transmission media comprising the optical fibers of each of the two or more optical fiber types.

4. The system of claim 1, wherein:
the transmission media over which traffic is carried in the optical channel includes multiple spans, the multiple spans comprising optical fibers of two or more optical fiber types; and
determining the symbol rate further comprises:
determining a ratio of a total length of spans comprising optical fibers of a first optical fiber type and a total length of spans comprising optical fibers of a second optical fiber type; and
obtaining the symbol rate from a data structure in which symbol rates are mapped to respective ratios of the total length of spans comprising optical fibers of the first optical fiber type and the total length of spans comprising optical fibers of the second optical fiber type.

5. The system of claim 1, wherein the memory media further store instructions executable by the processor for:
obtaining, from a data structure, routing information for the optical channel; and
determining, dependent on the routing information, one or more of:
the given target distance;
the given maximum data rate; and
the one or more characteristics of transmission media over which traffic is carried in the optical channel.

6. The system of claim 1, wherein determining a symbol rate for the optical channel is further dependent on an optical noise-to-signal ratio margin for the optical channel.

7. The system of claim 1, wherein the memory media further store instructions executable by the processor for:
detecting a topology change in the adaptive optical network; and
in response to the detected topology change:
selecting a different modulation format for the optical channel;
determining a different symbol rate for the optical channel;
determining a different number of subcarriers for the optical channel corresponding to the different symbol rate; and
re-configuring at least one of the one or more optical transponders to transmit or receive the traffic in the optical channel using the different modulation format and the different number of subcarriers.

8. The system of claim 1, wherein each of the plurality of optical transponders comprises:
a transmitter digital signal processor;
a receiver digital signal processor;
first circuitry to implement each of the plurality of modulation formats;
second circuitry to configure the transmitter digital signal processor to generate optical signals for transmission in the optical channel using the selected modulation format;
third circuitry to configure the transmitter digital signal processor to generate optical signals for transmission in the optical channel using the determined number of subcarriers; and
fourth circuitry to configure the receiver digital signal processor to process optical signals received over the optical channel in accordance with the selected modulation format and the determined number of subcarriers.

9. A method for extending reach in an adaptive optical network, comprising:
selecting a modulation format for an optical channel having a given target distance and a given maximum data rate, the selected modulation format having the highest spectral efficiency among one or more of a plurality of modulation formats supported in the adaptive optical network that are suitable for optical channels having the given target distance and the given maximum data rate;
determining a symbol rate for the optical channel dependent on one or more characteristics of transmission media over which traffic is carried in the optical channel;
determining a number of subcarriers for the optical channel corresponding to the determined symbol rate; and
activating subcarrier multiplexing for the optical channel, the activating including configuring one or more optical transponders to transmit or receive the traffic in the optical channel using the selected modulation format and the determined number of subcarriers, wherein
determining the symbol rate for the optical channel comprises obtaining the symbol rate from a data structure in which the symbol rate is mapped to the one or more characteristics of the transmission media over which the traffic is carried in the optical channel, and
the one or more characteristics of the transmission media include one or more of:
a dispersion coefficient of an optical fiber over which the traffic is carried in the optical channel;
a number of spans over which the traffic is carried in the optical channel; and
a respective length of each of one or more spans over which the traffic is carried in the optical channel.

10. The method of claim 9, wherein determining the symbol rate for the optical channel further comprises calculating the symbol rate dependent on a dispersion coefficient of an optical fiber over which the traffic is carried in the optical channel.

11. The method of claim 9, wherein:
the transmission media over which traffic is carried in the optical channel includes multiple spans, the multiple spans comprising optical fibers of two or more optical fiber types; and
determining the symbol rate further comprises:
determining respective portions of the transmission media comprising optical fibers of each of the two or more optical fiber types; and
calculating the symbol rate dependent on the respective portions of the transmission media comprising the optical fibers of each of the two or more optical fiber types.

12. The method of claim 9, wherein:
the transmission media over which traffic is carried in the optical channel includes multiple spans, the multiple spans comprising optical fibers of two or more optical fiber types; and
determining the symbol rate further comprises:
determining a ratio of a total length of spans comprising optical fibers of a first optical fiber type and a total length of spans comprising optical fibers of a second optical fiber type; and obtaining the symbol rate from a data structure in which symbol rates are mapped to respective ratios of the total length of spans comprising optical fibers of the first optical fiber type and the total length of spans comprising optical fibers of the second optical fiber type.

13. The method of claim 9, further comprising:
obtaining, from a data structure, routing information for the optical channel; and
determining, dependent on the routing information, one or more of:
the given target distance;
the given maximum data rate; and
the one or more characteristics of transmission media over which traffic is carried in the optical channel.

14. The method of claim 9, wherein determining a symbol rate for the optical channel is further dependent on an optical noise-to-signal ratio margin for the optical channel.

15. The method of claim 9, further comprising:
detecting a topology change in the adaptive optical network; and
in response to the detected topology change:
selecting a different modulation format for the optical channel;
determining a different symbol rate for the optical channel;
determining a different number of subcarriers for the optical channel corresponding to the different symbol rate; and
re-configuring at least one of the one or more optical transponders to transmit or receive the traffic in the optical channel using the different modulation format and the different number of subcarriers.

16. The method of claim 9, further comprising:
selecting a modulation format for another optical channel having another target distance or another maximum data rate, the selected modulation format having the highest spectral efficiency among one or more of a plurality of modulation formats supported in the adaptive optical network that are suitable for optical channels having the other target distance or the other maximum data rate;
determining a symbol rate for the other optical channel dependent on one or more characteristics of transmission media over which traffic is carried in the other optical channel;
determining a number of subcarriers for the other optical channel corresponding to the determined symbol rate for the other optical channel; and
activating subcarrier multiplexing for the other optical channel, the activating including configuring one or more other optical transponders to transmit or receive the traffic in the other optical channel using the modulation format selected for the other optical channel and the number of subcarriers determined for the other optical channel;
wherein at least one of the modulation format selected for the other optical channel and the number of subcarriers determined for the other optical channel is different than the modulation format selected for the given optical channel and the number of subcarriers determined for the given optical channel, respectively.

17. A method for extending reach in an adaptive optical network, comprising:
selecting a modulation format for an optical channel having a given target distance and a given maximum data rate, the selected modulation format having the highest spectral efficiency among one or more of a plurality of modulation formats supported in the adaptive optical network that are suitable for optical channels having the given target distance and the given maximum data rate;
determining a symbol rate for the optical channel dependent on one or more characteristics of transmission media over which traffic is carried in the optical channel;
determining a number of subcarriers for the optical channel corresponding to the determined symbol rate; and
activating subcarrier multiplexing for the optical channel, the activating including configuring one or more optical transponders to transmit or receive the traffic in the optical channel using the selected modulation format and the determined number of subcarriers, wherein
the transmission media over which traffic is carried in the optical channel includes multiple spans, the multiple spans comprising optical fibers of two or more optical fiber types, and
determining the symbol rate comprises:
determining respective portions of the transmission media comprising optical fibers of each of the two or more optical fiber types; and
calculating the symbol rate dependent on the respective portions of the transmission media comprising the optical fibers of each of the two or more optical fiber types.

* * * * *